United States Patent [19]

Hollis et al.

[11] Patent Number: 5,189,089
[45] Date of Patent: Feb. 23, 1993

[54] RESINOUS BINDERS HAVING IMPROVED DILUTION

[75] Inventors: Samuel D. Hollis, Savannah, Ga.; Thomas Y. J. Shiah, Yorktown Heights, N.Y.

[73] Assignee: Union Camp Corporation, Wayne, N.J.

[21] Appl. No.: 577,235

[22] Filed: Aug. 31, 1990

[51] Int. Cl.$^5$ .................. C08J 3/02; C08L 23/00; C09D 11/00; C09D 11/08

[52] U.S. Cl. ..................... 524/272; 106/22 R; 106/30 C; 524/271; 524/274; 524/270

[58] Field of Search ............ 524/272, 270, 271, 274; 106/22, 30

[56] References Cited

U.S. PATENT DOCUMENTS

| | | | |
|---|---|---|---|
| 3,961,965 | 6/1976 | Zwahlen | 106/26 |
| 4,066,810 | 1/1978 | Kosaka et al. | 106/30 |
| 4,084,032 | 4/1978 | Pasersky | 428/354 |
| 4,302,371 | 11/1981 | Matsuo et al. | 524/272 |
| 4,605,441 | 8/1986 | Masuda et al. | 524/270 |

*Primary Examiner*—Paul R. Michl
*Assistant Examiner*—Patrick D. Niland
*Attorney, Agent, or Firm*—William K. Wissing

[57] ABSTRACT

A resinous binder is disclosed which is composed of a metal rosin resinate and a dilution increasing effective amount of a poly(ethylene-vinyl acetate) type polymer having greater than 50,000 weight average molecular weight.

Also disclosed is a gravure printing ink which comprises a solvent, a colorant and a binder system wherein all or a portion of the binder system consists of the resinous binder of this invention. The use of the resinous binder of this invention in ink compositions results in significant dilution improvement without adversely affecting other desirable properties.

Also disclosed is a method for the preparation of a resinous binder having a toluene dilution value of at least 85 mls measured from a concentration of 50% solids to a viscosity of 7.5 centipoise wherein a metal oxide or metal hydroxide of zinc, calcium, sodium, potassium or magnesium is reacted with a rosin or modified rosin and a poly(ethylene-vinyl acetate) type polymer having a weight average molecular weight of at least 50,000.

29 Claims, No Drawings

RESINOUS BINDERS HAVING IMPROVED DILUTION

This invention relates to novel resinous and their use in gravure ink compositions and, more particularly, is concerned with resinous binders having a high "dilution."

BACKGROUND OF THE INVENTION

Inks used for gravure printing are comprised of a colorant, a binder and a solvent. It is crucial to the performance of gravure inks that they have the correct flow characteristics, in particular the correct viscosity. This is important in the inking of the recessed cells of the etched or engraved printing cylinder and the delivery of the ink from the cells of the plate to the substrate. The viscosity of the ink is also important in order to achieve an acceptable degree of holdout (resistance to penetration) of the ink when printed on paper, especially uncoated paper stock having high porosity. The lower the ink viscosity the more severe is the problem of lack of holdout.

The proper ink viscosity can be easily achieved by the use of greater amounts of binder and lesser amounts of solvent, but this increases the overall cost of the final ink. Also, use of large amounts of binder to obtain the desired viscosity means that in the final thinning of the ink by the printer less solvent can be employed, giving the printer less latitude in his formulations. The inks which cannot readily be diluted are also perceived by printers to have "low mileage," that is, less paper coverage per gallon. Printers prefer inks that can be diluted with greater amounts of solvent because of the benefits of economy of the final ink formulation and convenience in the formulation process.

The term "dilution" is a term of art used by ink formulators to describe the amount of solvent required to thin a given ink composition to a desired viscosity. The term may also be used for unpigmented resin solutions generally referred to as varnishes. In this context, the dilution of a resin or varnish is related to the property of "intrinsic viscosity" as used in the polymer art, that is, the higher the resin molecular weight, the higher the viscosity of solvent solution at lower concentrations and, therefore, the higher its possible dilution.

Metal rosin resinates have commonly been employed as ink binders in the formulation of gravure inks. The resinate serves to provide the ink with the necessary viscosity, transfer, printed gloss and rub resistance. However, achieving the desired high dilution with a metal rosin resinate alone has been difficult if not impossible to achieve because of the generally very low molecular weights typical of this class of resins.

In particular, desirable high dilution values in the range of 85-110 mls toluene, to reach print viscosity of about 7.5 cps as measured from 50% solids concentration, can be achieved only by neutralizing the resinate system to nearly 100% of theoretical with zinc oxide, magnesium oxide and/or calcium hydroxide. This, however, results in unacceptably high resinate viscosity and severe viscosity instability. In other words, the high dilution resinates can be made using conventional resinate formulations but they are too viscous to use conveniently, are difficult to manufacture, and are prone to increase further in viscosity during storage. Furthermore, higher dilution values of about 110 mls cannot be achieved using the above-described conventional approaches.

Various additional resins have been combined with the metal rosin resinates or added to the ink as dilution builders and also as binders in their own right. Highly phenol-modified rosins can be used in place of conventional rosins to achieve high dilution. However, these rosins are expensive and the resulting phenol-contaminated manufacturing waste must be treated or disposed as hazardous waste to avoid damage to the environment, which further increases the resinate cost. Cellulose derivatives are widely used in the industry to build ink dilution. These derivatives, especially ethyl cellulose and ethyl hydroxyethylcellulose (EHEC), have very high molecular weights. However, they are very expensive and have poor compatibility with resinates.

It has recently been taught by Janusz, U.S. Pat. No. 4,690,712 (1987), that reaction products of a metal rosin resinate and an amino-polyamide are useful as vehicles for publication gravure printing inks. Dilution improvements are reported. In making such reaction products, the polyamide must have sufficient amino groups so as to be soluble in toluene and also to be able to react in the ratio of 1-5 equivalents of the amino-polyamide to 1-5 equivalents of the carboxyl groups of the metal resinate. This need for balancing the stoichiometry of amino and carboxyl groups poses reproducibility and even gelation problems, as well as requiring more of the relatively costly amine to be used relative to the less costly resinate acid. The solubility requirement severely limits the softening point and molecular weight of the amino-polyamide. Additionally, inks prepared with these polyamides are excessively thixotropic, which is undesirable for a fluid gravure ink.

The prior art also describes the use of high acid number, low molecular weight polycarboxylic polymers to improve resinate properties. For example, Schefbauer, in U.S. Pat. No. 4,244,866 (1981), teaches the use of aloha-olefin/maleic anhydride copolymers and partial esters thereof with limed rosin to prepare novel resinates. Schefbauer nowhere discloses achieving particularly high dilution. The polymers disclosed by Schefbauer are claimed to allow the preparation of resinates with very high lime levels. To achieve this end, the polymers must have low molecular weights and high acid numbers, typically over 130, and are used in relatively large amounts, typically 10 weight percent on a total solids basis. These polymers have poor toluene tolerance and, in fact, are used as solutions in 60/40 toluene/methyl ethyl ketone. This approach necessarily introduces an undesired solvent, a ketone, into the gravure ink in significant amounts.

The combination of zinc resinates made from disproportionated rosin, a polymeric material, and paraffin for use in the preparation of adhesive compositions has been disclosed in the prior art. For example, Weymann in U.S. Pat. No. 3,929,703 (1975) teaches that a slightly basic zinc resinate made from disproportionated rosin may be blended with an ethylene-vinyl acetate copolymer and wax to form either hot melt or pressure sensitive adhesive compositions. The hot melt adhesive composition generally contains from 10% to 50% and preferably 20% to 30% by weight of a poly-olefin resin, 30% to 40% by weight of paraffin, and 30% to 60% by weight of a slightly basic zinc resinate. However, the zinc resinates used in Weymann would not be compatible or acceptable for use in the gravure printing process as the softening points of the disproportionated rosins used in the preparation of the zinc resinates (30° C. to 75° C.) are too low to be used in the gravure printing process. Gravure resinates are typically modified to yield softening points of greater than 180° C.

Adhesive compositions may also contain zinc resinate at levels from about 25–400% of the total weight of the other polymers present. Ethylene-vinyl acetate copolymers are often used in the adhesive compositions in relatively high amounts. The ethylene-vinyl acetate copolymer may be present in the adhesive composition at levels up to 50% by weight, and higher, of the total composition. Thus, when an ethylene-vinyl acetate polymer is used in an adhesive composition, it is often one of the major components of the adhesive composition.

SUMMARY OF THE INVENTION

A resinous binder is disclosed which is composed of a metal rosin resinate and a dilution increasing effective amount of a poly(ethylene-vinyl acetate) type polymer having greater than 50,000 weight average molecular weight and an acid number less than 100.

Also disclosed is a gravure printing ink which comprises a solvent, a colorant and a binder system wherein all or a portion of the binder system consists of the resinous binder of this invention. The use of the resinous binder of this invention in ink compositions results in significant dilution improvement without adversely affecting other desirable properties.

Also disclosed is a method for the preparation of a resinous binder having a toluene dilution value of at least 85 mls measured from a concentration of 50% solids to a viscosity of 7.5 centipoise comprising a metal oxide or metal hydroxide of zinc, calcium, sodium, potassium, aluminum, or magnesium; a rosin or modified rosin; and a poly(ethylene-vinyl acetate) type polymer having a weight average molecular weight of at least 50,000 and an acid number less than 100.

DETAILED DESCRIPTION OF THE PREFERRED EMBODIMENTS OF THE INVENTION

The rosin resinates employed to prepare a major portion of the ink binder compounds of this invention are well known as are the methods of their preparation. The resinate used may be any one of those conventionally used as binders in gravure printing inks. These are typically metal rosin resinates which can include but are not limited to zinc, magnesium and calcium resinates of rosins such as gum rosin, wood rosin and tall oil rosin, polymerized or dimerized rosins, formaldehyde-modified rosins, phenol-modified rosins, hydrocarbon-modified rosins, maleic-modified rosins, fumaric-modified rosins and the like.

The metal rosin resinates may be prepared according to the methods described, for example, in the U.S. Pat. No. 4,198,329 (Rudolphy et al., 1980), No. 4,528,036 (Rudolphy, 1985), and No. 4,552,592 (Rudolphy et al., 1985), all of which are incorporated herein by reference. The metal component of the metal resinate can be, for example, zinc, magnesium, calcium, sodium, potassium, or aluminum.

The polymers added to the metal rosin resinates to prepare the resinous binders of this invention, which binders are used in a gravure printing process, are formed primarily from ethylene and vinyl acetate. The poly(ethylene-vinyl acetate) type polymers include unmodified copolymers and terpolymers, wherein modifying levels of other monomers have been added to the copolymers to form the terpolymers. The copolymers may be modified, for example, with acids such as acrylic acid and maleic anhydride, acrylic and methacrylic esters, and styrene. In addition, blends of unmodified copolymers and terpolymers may be used to provide intermediate performance levels.

The poly(ethylene-vinyl acetate) type polymers used to prepare the resinous binders of the invention are those having a weight average molecular weight ($M_W$) of at least about 50,000 Daltons and an acid number of from about 0–100, and preferably from about 0–50. The level of vinyl acetate present in the polymers is such that the polymer is soluble in solvents of the type used in a gravure printing process, such as toluene, xylenes, and trimethylbenzenes, as well as aliphatic and aromatic naphthas, or the like. Methods of preparing these polymers are well known. Many such polymers are available commercially from various suppliers in a variety of forms, such as pellets, lattices and powders.

A preferred class of polymers for this invention are the terpolymers of an organic acid, ethylene, and vinyl acetate. On example of such a terpolymer is one containing up to 20% by weight of acrylic or methacrylic acid-derived monomeric chain units obtained by terpolymerization of ethylene, vinyl acetate and acrylic or methacrylic acids. The poly(ethylene-vinyl acetate) terpolymer typically contains from about 25–33% vinyl acetate. The poly(ethylene-vinyl acetate) type polymer suitable for use in this invention includes commercially available material such as Elvax ™ 4260, available from DuPont Corporation. The Elvax 4260 is a high molecular weight terpolymer of an organic acid, ethylene, and vinyl acetate, containing about 28% by weight of vinyl acetate and having an acid number of about 4–8.

The preferred method for the preparation of the resinous binder is by terminal addition, wherein the poly(ethylene-vinyl acetate) type polymer is admixed with a solution of the metal rosin resinate in an inert solvent. The metal rosin resinate solution and the polymer are combined with an adequate amount of solvent required to achieve the desired viscosity at a temperature sufficient to dissolve the poly(ethylene-vinyl acetate) type polymer in an appropriate time period. By way of example, the temperature range with respect to the Elvax 4260 is about 65° C. to 105° C.; however, it is not intended to limit the scope of the invention as one skilled in the art will realize that the temperature will be dependent upon the particular polymer and solvent used in the preparation of the resinous binder. The terminal addition method provides for efficient process control in that the precise level of polymer required to be added to the metal rosin resinate in order to achieve the desired high dilution value of the resinous binder can be determined and controlled by titration of the polymer into the metal rosin resinate solution.

Alternatively, the poly(ethylene-vinyl acetate) type polymer may be added to the molten rosin or modified rosin adduct prior to reaction with the metal oxides or metal hydroxides of zinc, sodium, potassium, magnesium, aluminum or calcium. In this case, the poly(ethylene-vinyl acetate) type polymer is added to the molten rosin or modified rosin which is at a temperature of about 200° C. to 240° C. The subsequent reaction with the metal oxides and metal hydroxides is performed at about 100° C. under reflux conditions.

The resinous binder comprises a minor proportion of the poly(ethylene-vinyl acetate) type polymer and an inert solvent, with the major proportion being the metal rosin resinate. The amount of the poly(ethylene-vinyl acetate) type polymer in the resinous binders may vary widely, for example, from about 0.1% to 10% on total solids of the final formulation of the resinous binder. It is preferred to use as little of the poly(ethylene-vinyl acetate) type polymer as is effective to increase the dilution value of the final product to the desired level of at least 85 mls and more preferably at least 100 mls as measured from a concentration of 50% solids to a print viscosity of about 7.5 cps so as to keep the formulation cost and product viscosity to a minimum. For these reasons, the preferred use level of the poly(ethylene-vinyl acetate) type polymer is about 0.5 to 2%, solids basis.

The resinous binder is advantageously prepared in the presence of an inert solvent. The term "inert solvent" as used herein means a solvent for the starting materials which does not enter into or adversely affect the desired course of the preparation. Representative of inert solvents are toluene, petroleum distillates, and treated petroleum distillates.

There are many variations in the art for the preparation of metal rosin resinates. These include modification of rosin with phenols and formaldehyde, maleic anhydride and/or fumaric acid, hydrocarbon materials such as dicyclopentadiene, poly(dicyclopentadiene), and low-cost materials such as tall oil pitch and urea. The polymers of the present invention may be used in combination with all such metal rosin resinates having any level of dilution to improve dilution, although the efficacy of a particular poly(ethylene-vinyl acetate) type polymer may vary according to the exact composition of the base metal rosin resinate. For example, the poly(ethylene-vinyl acetate)type polymers of the present invention may be combined with a low dilution resinate to give a moderate to high dilution resinate. In the preferred embodiment of the invention, the poly(ethylene-vinyl acetate) type polymer is combined with a resinate having moderate to high dilution to give a new resinate having acceptable viscosity, good viscosity stability, and about 85–110 mls toluene dilution measured from 50% solids to a print viscosity of 7.5 cps.

The gravure ink compositions of the invention are prepared by simple admixture of a binder component, at least a portion of which is comprised of the resinous binder of the invention, a colorant, a solvent and, optionally, other conventional binders. The proportion of binder component which is used is an amount which is effective to function as an ink binder, generally from 10 to 35 percent by weight of the final ink. The amount of the resinous binder which is included in the binder is an amount which is effective to increase the dilution.

The colorant may be any of the known pigments used in publication gravure inks, such as carbon black, iron blue complexes, barium lithol reds, azo yellows, phthalocyanines, or any other desired pigments of the types customarily used in such inks. The colorant can be added as such, or pre-dispersed in a liquid resinate medium to make an ink base as is commonly practiced in ink formulations. The choice of colorant is within the skill of the ink compounder and is not a critical feature of the invention, except that a pigment normally is present in a gravure printing ink. Soluble dyes may also be used, and the term colorant is meant to encompass both dyes and pigments. A coloring-effecting proportion of the colorant is used in the composition, generally 0.5 to 10 weight percent of the ink composition.

The solvent may be any of the aromatic hydrocarbon solvents conventionally used in publication gravure ink formulation, such as toluene, xylenes, trimethylbenzenes, aliphatic and aromatic naphthas, or the like, the preferred solvent being toluene for reasons of cost, acceptable toxicity and good rheological and evaporation properties. The solvent is used in an amount sufficient to wet and disperse the resinate and pigment with an acceptable print viscosity.

Additional components may be present in the inks of the invention, such as dispersing agents, surfactants, minor amounts of cosolvents, odorants, and the like.

Advantageously, the inks of the invention are prepared by first dispersing a pigment (or pigment concentrate) in any known low viscosity ("grinding") resinate by sufficient agitation, and shearing to comminute and disperse the pigment particles using a ball mill, shot mill or other equipment designed for this purpose. This concentrated pigment dispersion ("ink base") is then mixed with good agitation with the high-dilution resinous binder of the invention. The final ink is obtained by adding solvent to this pigment-resinate mixture until the desired viscosity is reached.

The resinous binders of the present invention are distinguished from the prior art resinates in that the poly(ethylene-vinyl acetate) type polymers have neither high amine number nor high acid number, but despite this, possess high molecular weight and excellent solubility in the mixture of toluene and the resinates. This excellent toluene solubility is highly unexpected in that even lower molecular weight poly(ethylene-vinyl acetate) type polymers, which would be expected to be more soluble, have at best marginal toluene compatibility. Poly(ethylene-vinyl acetate) type polymers are much less expensive than the cellulose derivatives heretofore used. The use of additional expensive cellulosic dilution builders can be decreased or avoided where these new resinous binders are employed. Consequently, the cost-effective use level of the poly(ethylene-vinyl acetate) type polymer is lower and the overall resinous binder cost is lower. In addition, the gelation problems associated with the use of the aminopolyamide-modified resinates of the prior art are avoided, as is the use of a compatibilitizing solvent such as an alcohol or ketone.

The resinous binders of the present invention are further distinct from the prior art adhesive compositions in that the ethylene-vinyl acetate used to modify metal rosin resinates is used at much lower levels, typically from 0.1 to 10% solids, and preferably from 0.5 to 2.0% solids of the total composition. It would be anticipated, and in fact is taught in the prior art, that if one reduces the polymeric material to such a low level in the adhesive composition, adequate adhesive properties would not be maintained. Furthermore, it would not be anticipated that if the polymeric material were reduced to such a low level that it would be present in amounts which would serve any function at all and, in particular, a positive function totally unrelated to adhesion, such as increasing dilution values of a resinous binder system in a gravure printing process.

Those skilled in the art will appreciate these and other advantages described hereinafter and associated with the resinous binder and ink compositions of the present invention.

The following examples show the manner and process of making and using the invention and set forth the best mode contemplated by the inventors for carrying out the invention, but are not to be construed as limiting the scope of the invention.

In the following examples, non-volatiles (or solids) content, or NV, is measured by weighing a 1-5g sample of resinate into a metal pan and evaporating the solvent, first at room temperature for about 1 hour, and then in a vacuum oven for 45 minutes at a temperature of about 100° C. The sample is then cooled and re-weighed. NV is then calculated by the formula:

$$NV = \frac{\text{Residue Weight}}{\text{Sample Weight}} \times 100\%$$

Dilution measurements are made following industry standard practice by weighing out a 100g resinate sample having about 50% non-volatile content and adding toluene to this at about 25° C with stirring. The Shell No. 2 Cup viscosity of the blended sample is measured and toluene addition continued until a reading of 15.0 seconds, equivalent to about 7.5 cps, is obtained. Dilution is recorded as the number of milliliters of toluene used to achieve this viscosity.

Resinate solution viscosity was measured at 25° C. by the Gardner-Holt Method, which is a well-known industry determination of the bubble rise type essentially identical to ASTM D-1545-76. It is important to appreciate that dilution values tend to increase with increasing viscosity of the resinate. However, the resinate must have sufficiently low viscosity as to be pumpable at ambient temperatures.

EXAMPLE 1

Maleic anhydride and fumaric acid were added to a reaction vessel containing molten rosin (Unitol ™ NCY, Union Camp) and the mixture was heated to 230° C. After one hour, the temperature was reduced to 150° C. and two-thirds of the solvent blend (See Table 1) was added under reflux conditions. The temperature was then reduced to 90° C. and a slurry of magnesium oxide, zinc oxide, and the remaining one-third of the solvent blend was added to the reaction mixture. The diethylene glycol and water were also added to the mixture at this time. The reaction mixture was held at 90° C. until the reaction mixture was clear, at which point the lime was added to the reaction mixture. The reaction mixture was heated to approximately 100° C. and refluxed until no additional water was collected and the reflux liquid was clear. The reaction mixture was then filtered into a metal container.

EXAMPLE 2

The same procedure as was used in Example 1 was used with the exception that Elvax 4260 was added one hour after the maleic anhydride and fumaric acid were added to the molten rosin. The reaction mixture was cooled from about 230° C. to about 200° C., held for one hour at 200° C. and then additionally cooled to 150° C. at which time the procedure of Example 1 was followed to completion. Dilution values and viscosity values were ascertained for both materials produced in Examples 1 and 2 (See Table 1).

TABLE 1

| | Example | |
|---|---|---|
| Ingredients: | 1 Weight % | 2 Weight % |
| UNITOL NCY | 42.33 | 41.34 |
| Maleic Anhydride | 1.39 | 1.40 |
| Fumaric Acid | 0.81 | 0.82 |
| Elvax 4260 | 0.00 | 0.95 |
| Solvent Blend[(1)] | 50.07 | 50.07 |
| MgO | 0.41 | 0.41 |
| ZnO | 1.62 | 1.64 |
| Diethylene Glycol | 0.20 | 0.20 |
| Water | 0.12 | 0.12 |
| Lime | 3.05 | 3.05 |
| Total | 100.00 | 100.00 |
| Properties: | | |
| Viscosity (Gardner) | P | Z |
| Dilution, ml[(2)] | 62 | 110 |

[(1)]Solvent Blend: 80% aliphatics/20% toluene, boiling range 111 to 132° C.
[(2)]Dulution: Milliliters of toluene required to reduce the viscosity of 100 grams of resinate solution to 15 seconds on a #2 Shell Cup @ 25° C.

EXAMPLE 3

This is a comparative example wherein a sample of UNI REZ ™ 1071, a commercially available Union Camp metal rosin resinate solution, was tested for viscosity and dilution values (See Table 2).

EXAMPLE 4

A sample of UNI-REZ 1071 was charged to a reaction vessel and heated to 105° C. One part of Elvax 4260 and 0.8 parts of toluene were then added. The sample was blended for two hours at 105° C. while the Elvax dissolved. The reaction mixture was then cooled to 25° C. and tested for viscosity and dilution values. The results indicate that the dilution value increased while the viscosity remained essentially the same (See Table 2).

TABLE 2

| | Example | |
|---|---|---|
| Ingredients: | 3 | 4 |
| UNI-REZ 1071 | 100 Parts | 100 Parts |
| Elvax 4260 | None | 1 |
| Toluene | None | 0.8 |
| Properties: | | |
| Non-Volatile Solids, % | 56 | 56 |
| Viscosity (Gardner) | Z6 | Z6 |
| Dilution, ml[(1)] | 118 | 132 |
| Adjusted Dilution, ml[(2)] | 93 | 105 |
| Appearance | Clear | Clear |

[(1)]Dilution: Milliliters of toluene required to reduce the viscosity of 100 grams of resinate solution to 15 seconds on a #2 Shell Cup @ 25° C.
[(2)]Dilution adjusted for 50% non-volatile solids.

What is claimed is:

1. A resinous binder for use in a gravure printing ink composition containing a colorant, a solvent and a binder system, said resinous binder having known solids content and comprising:
   (a) a metal rosin resinate,
   (b) a poly (ethylene-vinyl acetate) type polymer having a weight average molecular weight of at least 50,000, and optionally
   (c) a solvent; wherein:
   said metal rosin resinate constitutes a major proportion of said solids;
   said poly(ethylene-vinyl acetate) type polymer constitutes a minor proportion of said solids; and
   said poly(ethylene-vinyl acetate) type polymer is present in the resinous binder in an amount which is effective to increase the dilution of the resinous binder as compared to the dilution of the metal rosin resinate alone.

2. A resinous binder for use in a gravure printing ink composition containing a colorant, a solvent and a binder system, said resinous binder having known solids content and comprising:
(a) a metal rosin resinate,
(b) a poly(ethylene-vinyl acetate) type polymer having a weight average molecular weight of at least 50,000, and optionally
(c) a solvent; wherein:
said metal rosin resinate constitutes a major proportion of said solids;
said poly(ethylene-vinyl acetate) type polymer constitutes a minor proportion of said solids; and
said minor proportion is an amount which is effective to impart a toluene dilution value of at least 85 mls to a print viscosity of about 7.5 cps measured from a 100 gram sample of the resinous binder having a concentration of 50% solids.

3. The resinous binder according to claim 2 wherein the metal of the metal rosin resinate is selected from the group consisting of zinc, magnesium, calcium, sodium, potassium and aluminum.

4. The resinous binder according to claim 2 wherein the metal rosin resinate is prepared from a rosin selected from the group consisting of gum rosin, wood rosin, tall oil rosin, polymerized rosin, dimerized rosin, maleic-modified rosin, fumaric-modified rosin, formaldehyde-modified rosin, tall oil pitch-modified rosin, dicyclopentadiene-modified rosin and phenol-modified rosin.

5. The resinous binder according to claim 2 wherein the poly(ethylene-vinyl acetate) type polymer is a terpolymer of an organic acid, ethylene, and vinyl acetate.

6. The resinous binder according to claim 5 wherein the poly(ethylene-vinyl acetate) type polymer contains up to 20% by weight of acrylic or methacrylic acid-derived monomeric chain units obtained by terpolymerization of ethylene, vinyl acetate, and acrylic or methacrylic acids.

7. The resinous binder according to claim 2 wherein the poly(ethylene-vinyl acetate) type polymer is an ethylene-vinyl acetate copolymer.

8. The resinous binder according to claim 2 comprised of from about 0.1 to about 10% solids of the poly(ethylene-vinyl acetate) type polymer.

9. The resinous binder according to claim 2 comprised of from about 0.5 to about 2.0% solids of the poly(ethylene-vinyl acetate) type polymer.

10. A gravure printing ink composition comprising a colorant, a solvent, and a component binder, said component binder containing a resinous binder that has known solids content and that comprises:
(a) a metal rosin resinate,
(b) a poly(ethylene-vinyl acetate) type polymer having a weight average molecular weight of at least 50,000, and optionally
(c) a solvent; wherein:
said metal rosin resinate constitutes a major proportion of said solids;
said poly(ethylene-vinyl acetate) type polymer constitutes a minor proportion of said solids; and
said poly(ethylene-vinyl acetate) type polymer is present in the resinous binder in an amount which is effective to increase the dilution of the resinous binder as compared to the dilution value of the metal resinate alone.

11. A gravure printing ink composition comprising a colorant, a solvent, and a component binder, said component binder containing a resinous binder that has known solids content and that comprises:
(a) a metal rosin resinate,
(b) a poly(ethylene-vinyl acetate) type polymer having a weight average molecular weight of at least 50,000, and optionally
(c) a solvent; wherein:
said metal rosin resinate constitutes a major proportion of said solids;
said poly(ethylene-vinyl acetate) type polymer constitutes a minor proportion of said solids; and
said minor proportion is an amount which is effective to impart a toluene dilution value of at least 85 mls to a print viscosity of about 7.5 cps measured from a 100 gram sample of the resinous binder having a concentration of 50% solids.

12. The ink composition according to claim 11 wherein the metal of the metal rosin resinate is selected from the group consisting of zinc, magnesium, calcium, sodium, potassium, and aluminum.

13. The ink composition according to claim 11 wherein the metal rosin resinate is prepared form a rosin selected from the group consisting of gum rosin, wood rosin, tall oil rosin, polymerized rosin, dimerized rosin, maleic-modified rosin, tall oil pitch modified rosin, dicyclopentadiene-modified rosin and phenol-modified rosin.

14. The ink composition according to claim 11 wherein the poly(ethylene-vinyl acetate) type polymer is a terpolymer of an organic acid, ethylene and vinyl acetate.

15. The ink composition according to claim 14 wherein the poly(ethylene-vinyl acetate) type polymer contains up to 20% by weight of acrylic or methacrylic acid-derived monomeric chain units obtained by terpolymerization of ethylene, vinyl acetate, and acrylic or methacrylic acid.

16. The ink composition according to claim 11 wherein the poly(ethylene-vinyl acetate) type polymer is an ethylene-vinyl acetate copolymer.

17. The ink composition according to claim 11 wherein the resinous binder is comprised of from about 0.1 to about 10% solids of the poly(ethylene-vinyl acetate) type polymer.

18. The ink composition according to claim 11 wherein the resinous binder is comprised of from about 0.5 to about 2.0% solids of the poly(ethylene-vinyl acetate) type polymer.

19. A method for the preparation of the resinous binder of claim 2 comprising forming an admixture of a poly(ethylene-vinyl acetate) type polymer with a metal rosin resinate, and optionally with a first amount of a solvent; combining the resulting admixture with a second amount of solvent adequate to achieve a given dilution value of the resinous binder, at a temperature and time sufficient to dissolve the polymer in the resulting solution.

20. The method according to claim 19 wherein the amount of polymer added to the metal rosin resinate to achieve the given dilution value of the resinous binder is determined by titration of the polymer into the resulting solution.

21. A method for the preparation of the resinous binder of claim 2 comprising the step of admixing a poly(ethylene-vinyl acetate) type polymer with a molten rosin or a modified rosin adduct, and reacting the resulting admixture under reflux conditions with metal oxides or hydroxides of zinc, sodium, potassium, magnesium, aluminum or calcium.

22. The resinous binder of claim 1 wherein said metal rosin resinate has a softening point greater than 180° C.

23. The resinous binder of claim 2 wherein said metal rosin resinate has a softening point greater than 180° C.

24. The gravure printing ink composition of claim 10 wherein said metal rosin resinate has a softening point greater than 180° C.

25. The gravure printing ink composition of claim 11 wherein said metal rosin resinate has a softening point greater than 180° C.

26. A resinous binder for use in an ink composition containing a colorant, a solvent and a binder system, said resinous binder having known solids content and comprising:
   (a) a metal rosin resinate,
   (b) a poly(ethylene-vinyl acetate) type polymer having a weight average molecular weight of at least 50,000, and optionally
   (c) a solvent; wherein:
   said metal rosin resinate constitutes a major proportion of said solids;
   said poly(ethylene-vinyl acetate) type polymer constitutes a minor proportion of said solids;
   said metal rosin resinate has a softening point of sufficient magnitude that said ink composition can be used in a gravure printing process; and
   said poly(ethylene-vinyl acetate) type polymer is present in the resinous binder in an amount which is effective to increase the dilution of the resinous binder as compared to the dilution of the metal rosin resinate alone.

27. The resinous binder of claim 26 wherein said minor proportion is an amount which is effective to impart a toluene dilution value of at least 85 mls to a print viscosity of about 7.5 cps measured from a 100 gram sample of the resinous binder having a concentration of 50% solids.

28. A printing ink composition comprising a colorant, a solvent and a component binder, said component binder containing a resinous binder that has known solids content and that comprises:
   (a) a metal rosin resinate,
   (b) a poly(ethylene-vinyl acetate) type polymer having a weight average molecular weight of at least 50,000, and optionally
   (c) a solvent; wherein:
   said metal rosin resinate constitutes a major proportion of said solids;
   said poly(ethylene-vinyl acetate) type polymer constitutes a minor proportion of said solids;
   said metal rosin resinate has a softening point of sufficient magnitude that said ink composition can be used in a gravure printing process; and
   said poly(ethylene-vinyl acetate) type polymer is present in the resinous binder in an amount which is effective to increase the dilution of the resinous binder as compared to the dilution of the metal rosin resinate alone.

29. The ink composition of claim 28 wherein said minor proportion is an amount which is effective to impart a toluene dilution value of at least 85 mls to a print viscosity of about 7.5 cps measured from a 100 gram sample of the resinous binder having a concentration of 50% solids.

* * * * *